P. J. FLANAGAN.
Belt-Fasteners.
No. 218,008.   Patented July 29, 1879.
FIG. 1.
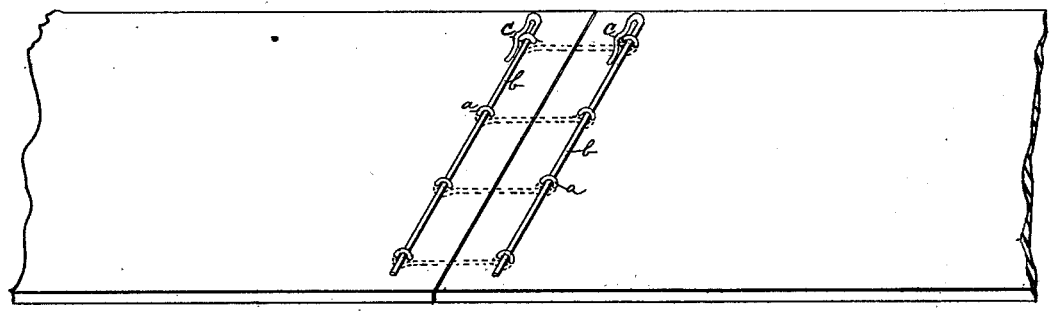
FIG. 2.
FIG. 3.

UNITED STATES PATENT OFFICE.

PATRICK J. FLANAGAN, OF NEW ORLEANS, LOUISIANA.

IMPROVEMENT IN BELT-FASTENERS.

Specification forming part of Letters Patent No. 218,008, dated July 29, 1879; application filed February 4, 1879.

*To all whom it may concern:*

Be it known that I, PATRICK JOSEPH FLANAGAN, a resident of the city of New Orleans, parish of Orleans, and State of Louisiana, have invented a certain new and useful Improvement in Belt-Fasteners; and I do hereby declare the following to be a full, clear, and correct description of the same, reference being had to the annexed drawings, making a part of this specification.

This invention relates to that class of belt-fasteners in which links with eyes at each end passing through the ends of the belt are secured by rods passing transversely through said eyes.

The said invention consists in the peculiar construction and attachment of the fastening devices, hereinafter particularly set forth and claimed.

Figure 1 of the accompanying drawings represents the ends of a belt secured by my fastening devices, and Figs. 2 and 3 represent different forms of link in detail.

In said drawings, $a$ designates the links, each of which consists of a straight rod or bar having an eye or perforated lug at each end. These eyes or lugs are passed up through openings in the belt ends when the belt is to be fastened. Several of these links are thus employed with every belt, and arranged so that the eyes of their corresponding ends are on a line. Rods $b\ b$ are then passed transversely through these eyes to complete the fastening.

Said rods $b$ are straight and have one end quite unobstructed, so as to readily enter said eyes and be readily withdrawn therefrom. The other end of each rod $b$ is shaped into a spring-hook for clasping the outside link on that side, and in that spring-hook a curve, $c$, is formed, which is adapted to the shape of said link.

When said rod is passed into said links the eye of the said outside link lifts said spring-hook and passes under the same until the curve $c$ is reached. The operation of the said spring-hook and its curve or recess on the said eye is to prevent the accidental displacement of the rod $b$. The latter may, however, be readily removed by lifting the spring-hook.

The two rods are counterparts in construction and operation. They may be applied from either side of the belt. The removal of either one of them suffices to uncouple it.

The links are preferably formed of wire, but may be punched from plate or sheet metal. One so produced is shown in Fig. 3.

My construction of fasteners leaves the belt firm and smooth at the point of fastening, and has the advantage of easy attachment and detachment, united with protection against separation by accident.

I do not claim, broadly, a series of links with transverse connecting-bars passing through the eyes of said links for fastening the belt; but What I do claim, and desire to secure by Letters Patent, is—

The combination, with links $a$, having eyes in their ends, of coupling-rods $b$, having a spring-hook formed at one end and curved at $c$, to fit the eyes of the links on one side of the belt and allow their easy attachment and detachment.

In testimony whereof I have hereunto signed my name.

P. J. FLANAGAN.

In presence of—
 JOSEPH TAYLOR,
 PETER FINNEY.